(12) United States Patent
Brunel

(10) Patent No.: US 7,286,517 B2
(45) Date of Patent: Oct. 23, 2007

(54) MULTI-USER DETECTION METHOD FOR A RECEIVER IN A MC-CDMA TELECOMMUNICATION SYSTEM

(75) Inventor: Loic Brunel, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1072 days.

(21) Appl. No.: 10/238,719

(22) Filed: Sep. 11, 2002

(65) Prior Publication Data

US 2003/0072291 A1 Apr. 17, 2003

(30) Foreign Application Priority Data

Oct. 4, 2001 (EP) .................................. 01123755

(51) Int. Cl.
*H04B 7/216* (2006.01)
*H04B 1/10* (2006.01)
*H03D 1/04* (2006.01)
*H03D 1/06* (2006.01)
*H03K 5/01* (2006.01)
*H04L 1/00* (2006.01)
*H04L 25/08* (2006.01)

(52) U.S. Cl. ...................... 370/342; 375/346
(58) Field of Classification Search ................ 370/203, 370/342, 479; 375/346
See application file for complete search history.

(56) References Cited

U.S. PATENT DOCUMENTS

| | | | |
|---|---|---|---|
| 5,377,225 A | 12/1994 | Davis | |
| 5,761,237 A | 6/1998 | Petersen et al. | |
| 6,075,792 A | 6/2000 | Ozluturk | |
| 6,151,358 A | 11/2000 | Lee et al. | |
| 6,175,588 B1 | 1/2001 | Visotsky et al. | |
| 6,201,799 B1 | 3/2001 | Huang et al. | |
| 6,240,099 B1 | 5/2001 | Lim et al. | |
| 6,301,293 B1 | 10/2001 | Huang et al. | |
| 6,614,836 B1 | 9/2003 | Halford et al. | |
| 6,654,408 B1 | 11/2003 | Kadous et al. | |

(Continued)

OTHER PUBLICATIONS

N. Yee et al., entitled "Multicarrier CDMA in Indoor Wireless Radio Networks" which appeared in Proceedings of PIMRC '93, vol. 1, pp. 109-113, 1993.

(Continued)

*Primary Examiner*—Kevin C. Harper
(74) *Attorney, Agent, or Firm*—Oblon, Spivak, McClelland, Maier & Neustadt, P.C.

(57) ABSTRACT

The present invention concerns a multi-user detection method for a receiver in a MC-CDMA telecommunication system, each communication to or from a user of the system being coded with a signature, the signal received by said receiver being decomposed into a first plurality of frequency components, where the frequency components are subjected to a first filtering matched to the respective signatures of a second plurality of users and to the common or the respective responses of the transmission channels associated to the communications to or from said users; a first estimation of the symbols transmitted to or by the users is obtained from the output of the first filtering; a multi-user interference is derived from the first estimation and subtracted from the output of the first filtering to provide a cleared output; a second estimation of the symbols transmitted to or by the users is obtained from the cleared output.

17 Claims, 7 Drawing Sheets

U.S. PATENT DOCUMENTS

| | | | |
|---|---|---|---|
| 6,711,219 | B2 | 3/2004 | Thomas et al. |
| 6,792,033 | B1 | 9/2004 | Maruta et al. |
| 6,907,513 | B2 | 6/2005 | Nakanishi |
| 6,956,892 | B2 | 10/2005 | Ylitalo |
| 7,054,378 | B2 * | 5/2006 | Walton et al. .............. 375/267 |
| 7,058,115 | B2 | 6/2006 | Castelain |
| 2003/0021249 | A1 | 1/2003 | Kim et al. |
| 2003/0053527 | A1 | 3/2003 | Brunel |

OTHER PUBLICATIONS

S. Hara et al., entitled "Overview of Multicarrier CDMA" published in IEEE Communications Magazine, pp. 126-133, Dec. 1997.

J. -F. Hélard, J.-Y. Baudais and J. Citerne, entitled "Linear MMSE Detection Technique for MC-CDMA" published in Electronics Letters, vol. 36, No. 7. pp. 665-666, Mar. 30, 2000.

U.S. Appl. No. 10/189,033, filed Jul. 5, 2002, Brunel.

U.S. Appl. No. 10/238,719, filed Sep. 11, 2002, Brunel.

Peter Jung, et al.; A Generalized View on Multicarrier CDMA Mobile Radio Systems with Joint Detection (Part I) vol. 51, No. 7-8; Jul. 1, 1997; pp. 174-185.

Peter Jung, et al.; A Generalized View on Multicarrier CDMA Mobile Radio Systems with Joint Detection (Part II) vol. 51, No. 11-12; Nov. 1, 1997; pp. 270-275.

Alexandra Duel-Hallen; "Equalizer for Multiple Input/Multiple Output Channels and PAM Systems with Cyclostationary Input Sequences"; IEEE Journal on Selected Areas in Communications, vol. 10, No. 3, pp. 630-639; Apr. 1992.

Thomas P. Krauss, et al.; "MMSE equalization for forward link in 3GCDMA: symbol-level versus chip-level"; Aug. 14-16, 2000, IEEE, Statistical Signal and Array Processing, 2000. Proceedings of Workshop on, 18-22.

* cited by examiner

MULTI-USER DETECTION METHOD FOR A RECEIVER IN A MC-CDMA TELECOMMUNICATION SYSTEM

BACKGROUND OF THE INVENTION

1. Field of the Invention

The present invention relates to a multi-user detection method for a receiver in a multi-carrier code division multiple access system and more specifically to a multi-user detection method with parallel interference cancellation. The present invention concerns also a MC-CDMA receiver implementing such a parallel interference cancellation.

2. Description of the Related Art

Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109–113, 1993. The developments of this technique were reviewed by S. Hara et al. in the article entitled "Overview of Multicarrier CDMA" published in IEEE Communication Magazine, pages 126–133, December 1997.

Unlike the DS-CDMA (Direct Sequence Code Division Multiple Access) method, in which the signal of each user is multiplied in the time domain in order to spread its frequency spectrum, the signature here multiplies the signal in the frequency domain, each element of the signature multiplying the signal of a different sub-carrier.

More precisely, FIG. 1 shows the structure of an MC-CDMA transmitter for a given user k. Let $b_k(i)$ be the $i^{th}$ symbol to be transmitted from the user k, where $b_k(i)$ belongs to the modulation alphabet. The symbol $b_k(i)$ is first of all multiplied at 110 by a spreading sequence or signature of the user, denoted $c_k(t)$, consisting of N "chips", each "chip" being of duration $T_c$, the total duration of the spreading sequence corresponding to a symbol period T The results of the multiplication of the symbol $b_k(i)$ by the different "chips" are converted by the serial to parallel converter 120 into a block of L symbols, where L is in general a multiple of N. It will be considered, for reasons of simplification of presentation, that L=N. The block of L symbols is then subjected to an inverse fast Fourier transformation (IFFT) in the module 130. In order to prevent intersymbol interference, a guard interval, with a length greater than the duration of the pulse-type response of the transmission channel, is added to the MC-CDMA symbol. This interval is obtained by appending a suffix (denoted Δ) identical to the start of the said symbol. After parallel to serial conversion in 140, the MC-CDMA symbols thus obtained are amplified at 150 in order to be transmitted over the user channel. It can therefore be seen that the MC-CDMA method can be analysed into a spreading in the spectral domain (before IFFT) followed by an OFDM modulation.

In practice, a user k transmits his data in the form of frames of I symbols, each symbol $b_k(i)$ being spread by a real signature $c_k(t)$, typically a Walsh-Hadamard signature, with a duration equal to the symbol period T, such that $c_k(t)=0$ if $t \notin [0,T]$. The signal modulated at time $t=(i-1) \cdot T + (l-1) \cdot T_c$ can then be written, if the guard intervals between MC-CDMA symbols are omitted:

$$S_k(t) = \sum_{i=1}^{I} \sum_{l=1}^{L} \omega_k \cdot c_k((l-1) \cdot T_c) \cdot b_k(i-1) \cdot \exp(j \cdot 2\pi(l-1)/L) \quad (1)$$

where $\omega_k$ is the amplitude of the signal transmitted by the user k, assumed to be constant over a transmission unit.

An MC-CDMA receiver for a given user k has been illustrated schematically in FIG. 2. This receiver is known as single-user detection receiver (or SUD receiver) because the detection takes only into account the symbols transmitted to (or from) the user in question.

The demodulated received signal is sampled at the "chip" frequency. The signal thus obtained can be written:

$$R(t) = \sum_{k=1}^{K} \sum_{i=1}^{I} \sum_{l=1}^{L} h_{kl}(i-1) \cdot \omega_k \cdot c_{kl} \cdot b_k(i-1) \cdot \exp(j \cdot 2\pi(l-1)/L) + n(t) \quad (2)$$

where K is the number of users, $c_{kl}=c_k(l-1) \cdot T_c$, $h_{kl}(i)$ represents the response of the channel of the user k to the frequency of the subcarrier l of the MC-CDMA symbol transmitted at time $i \cdot T$ and where n(t) is the received noise.

If the downlink channel is considered, the transmission channels have identical characteristics and therefore $h_{kl}=h_l$.

The samples obtained by sampling at the "chip" frequency are put in parallel in a serial to parallel converter 210 and stripped from the suffix (Δ) before undergoing an FFT in the module 220.

In MC-CDMA, the presence of the guard period makes it possible to neglect the intersymbol interference. For a given subcarrier (hereinafter simply called carrier), the equalisation can therefore be performed by a single tap, i.e. by a multiplication by a complex coefficient. In the SUD receiver, the equalisation is performed carrier-by-carrier i.e. by applying one of the known equalisation methods: MRC (Maximum Ratio Combining), EGC (Equal Gain Combining), ZF (Zero Forcing) or MMSE (Minimum Mean Square Error) independently on each carrier. The equalising coefficients thus obtained are denoted $q_{k,1}, \ldots, q_{k,L}$ on FIG. 2.

The samples in the frequency domain, output from 220, are multiplied by the equalising coefficients and the signature of the user k in $240_0, \ldots, 240_{L-1}$ (for despreading) before being added in 250. The result is a soft estimate $\tilde{b}_k(i)$ of the transmitted symbol $b_k(i)$. The soft estimate is then subjected to a hard decision in the hard decision module 260 to output an estimate $\hat{b}_k(i)$ belonging to the modulation alphabet.

The multiuser detection techniques are known notably in CDMA telecommunications systems. They have the common characteristic of taking account of the interference generated by the other users.

A multiuser detection or MUD technique for MC-CDMA was presented in the article by J-Y. Beaudais, J. F. Helard and J. Citerne entitled "A novel linear MMSE detection technique for MC-CDMA" published in Electronics Letters, Vol. 36, No7, pages 665–666, 30 Mar. 2000. The equalisation method proposed no longer operates carrier by carrier but MC-CDMA symbol by MC-CDMA symbol, taking account of all the carriers and all the signatures of the active users. For this reason it is called GMMSE (Global Minimum Mean Square Error) equalisation or, equivalently, M-MMSE (Matrix Minimum Mean Square Error) equalisation. Its purpose is to minimise the mean square error between the soft estimated symbols $\tilde{b}_k(i)$ and the transmitted symbols $b_k(i)$. The soft estimate is then subjected to a hard decision in the hard decision module 360.

An MC-CDMA receiver with GMMSE equalisation for a user k has been shown in FIG. 3. Its structure differs from that of FIG. 2 in that the equalisation is effected by means of a multiplication 330 by a matrix Q of the signals of the different carriers. The despread signal obtained at the output of the adder 350 gives a soft estimate $\tilde{b}_k(i)$ of the transmitted symbol $b_k(i)$.

Furthermore, there have been proposed MC-CDMA receivers using either a parallel interference cancellation (PIC) scheme or a serial interference cancellation scheme (SIC), as disclosed in the article by J-Y. Beaudais et al. Parallel interference cancellation consists in iteratively cancelling the multiple access interference (MAI) by subtracting for a given user the contributions due to the other users, these contributions being obtained, for a given step, by respreading the symbols estimated at the previous step and filtering them with filters modelling the transmission channels over which they have propagated. In contrast, serial interference cancellation consists in successively eliminating the contributions of the users in a cascade of stages, each stage eliminating the contribution of a particular user, commencing by the contribution of highest power.

FIG. 4 illustrates the structure of a MC-CDMA receiver with parallel interference cancellation. For the sake of clarity, only the part related to a user k has been represented. In FIG. 4, r(i) denotes the output of the FFT, i.e. the vector of frequency components supplied by stage 320 in FIG. 3 at time i·T These components are subjected to a first equalisation in 410. More precisely, 410 provides for an equalisation for the K−1 transmission channels associated with the users k'=1, . . . K, k'≠k . If we consider the downlink receiver, the transmission channels are identical, the equalisation 410 amounts to a simple multiplication by an L×L matrix and the output is a vector of dimension L. In the uplink receiver however, K−1 matrices are involved, each matrix corresponding to a transmission channel of a user. These K−1 matrices are represented by the tensor $\tilde{Q}^{(l)}$, where the index (l) stands for the first cancellation stage. After equalisation, the received MC-CDMA symbols are despread in 420 with the K−1 signatures of the users k'=1, . . . K, k'≠k, and detected in 430. This first estimation does not take into account the MAI. The detected symbols are then respread by said signatures in 440 and the MC-CDMA symbols thus obtained are filtered by K−1 filters modelling the transmission channels of the users k'. Each filter can be represented by an L×L diagonal matrix and the K−1 matrices are represented by the tensor H̃. Here again, if the downlink receiver is considered, the latter matrices are identical. In any case, the K−1 outputs of 450 give the respective contributions of the users k' to the MAI. They are subtracted from r(i) (delayed so as to compensate for the processing time in 410–450) in 460$_1$, . . . , 460$_{K-1}$. The output of 460$_{K-1}$ is a version of r(i) freed of a first estimation of MAI. The process can be repeated so as to refine the estimation of the MAI and jointly improve the detection of the symbols. The last stage is followed by a classical single-user equalisation in 470, despreading in 480 and symbol detection in 490 as in FIG. 2.

The proposed parallel and serial cancellation schemes in MC-CDMA are rather complex in particular for the uplink receiver since some processing stages are performed at the carrier level and therefore involve (K−1)·L operations in parallel where K is the number of users and L is the number of carriers.

The object of the present invention is to propose a MC-CDMA receiver with multi-user detection and MAI removal which is simpler than those known from the prior art. In particular, the object of the invention is to propose a MC-CDMA receiver of said type which is simpler when the number of users is low.

SUMMARY OF THE INVENTION

The above mentioned object is attained by a multi-user detection method as claimed in appended claim 1 and a multi-user receiver as claimed in independent claim 13. Further advantages are given by the technical features recited in the dependent claims.

BRIEF DESCRIPTION OF THE DRAWINGS

The characteristics of the invention mentioned above, as well as others, will emerge more clearly from a reading of the following description given in relation to the accompanying figures, amongst which.

DESCRIPTION OF THE PREFERRED EMBODIMENTS

Figure 1:
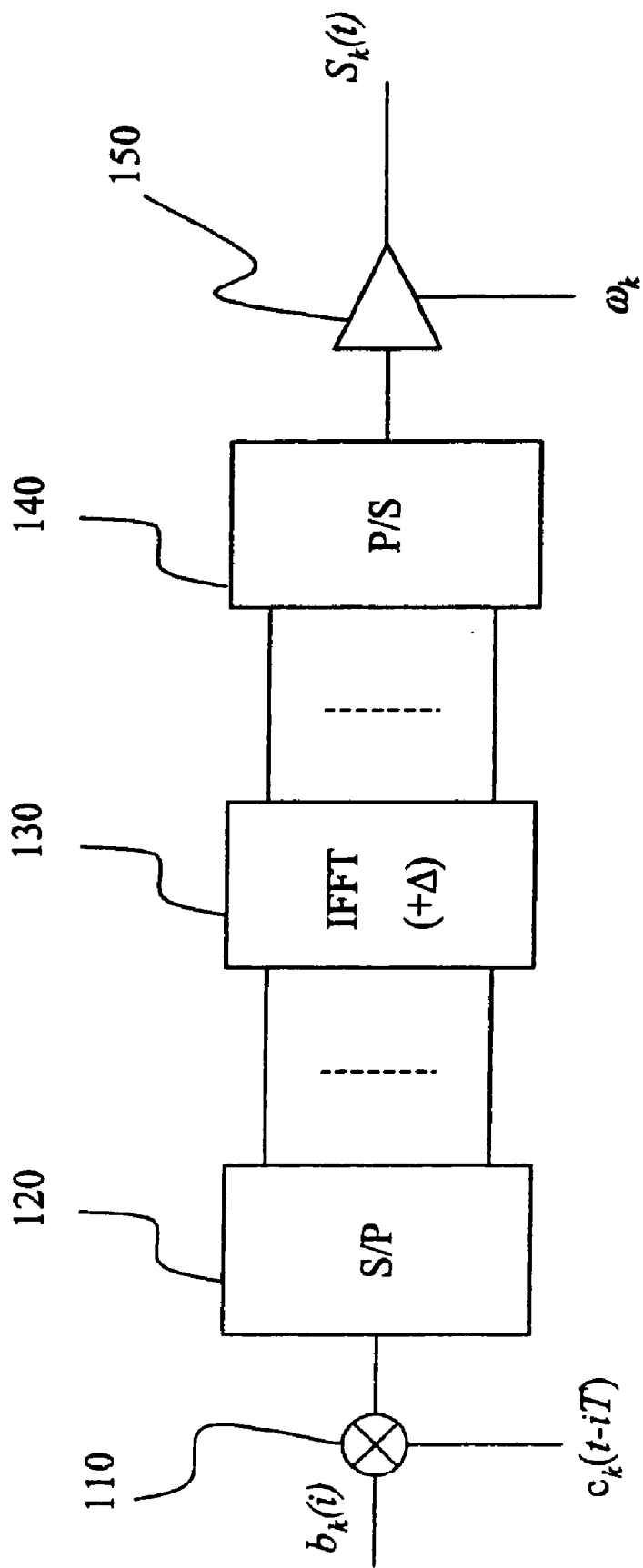
FIG. 1 depicts schematically the structure of an MC-CDMA transmitter known from the state of the art.
Figure 2:
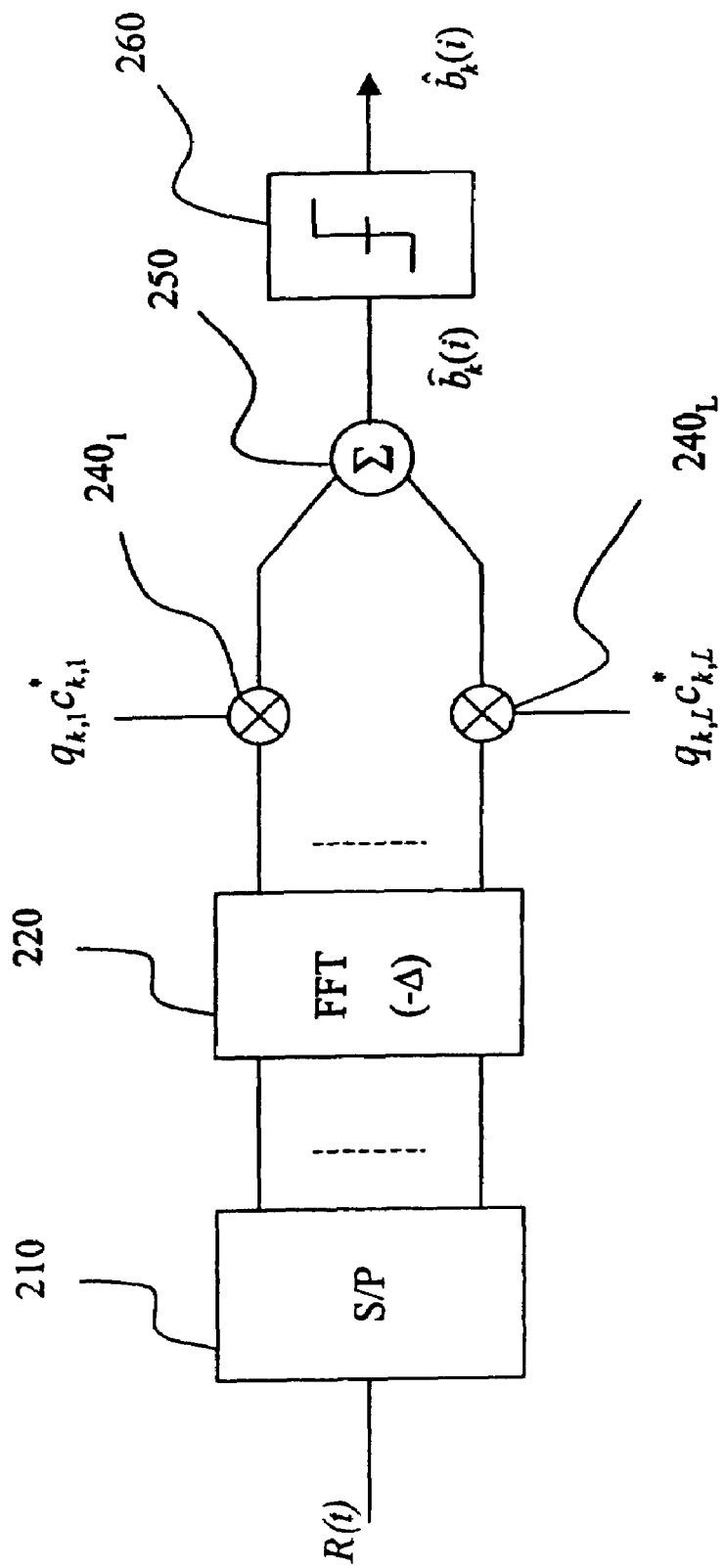
FIG. 2 depicts schematically the structure of a first MC-CDMA receiver known from the state of the art.
Figure 3:
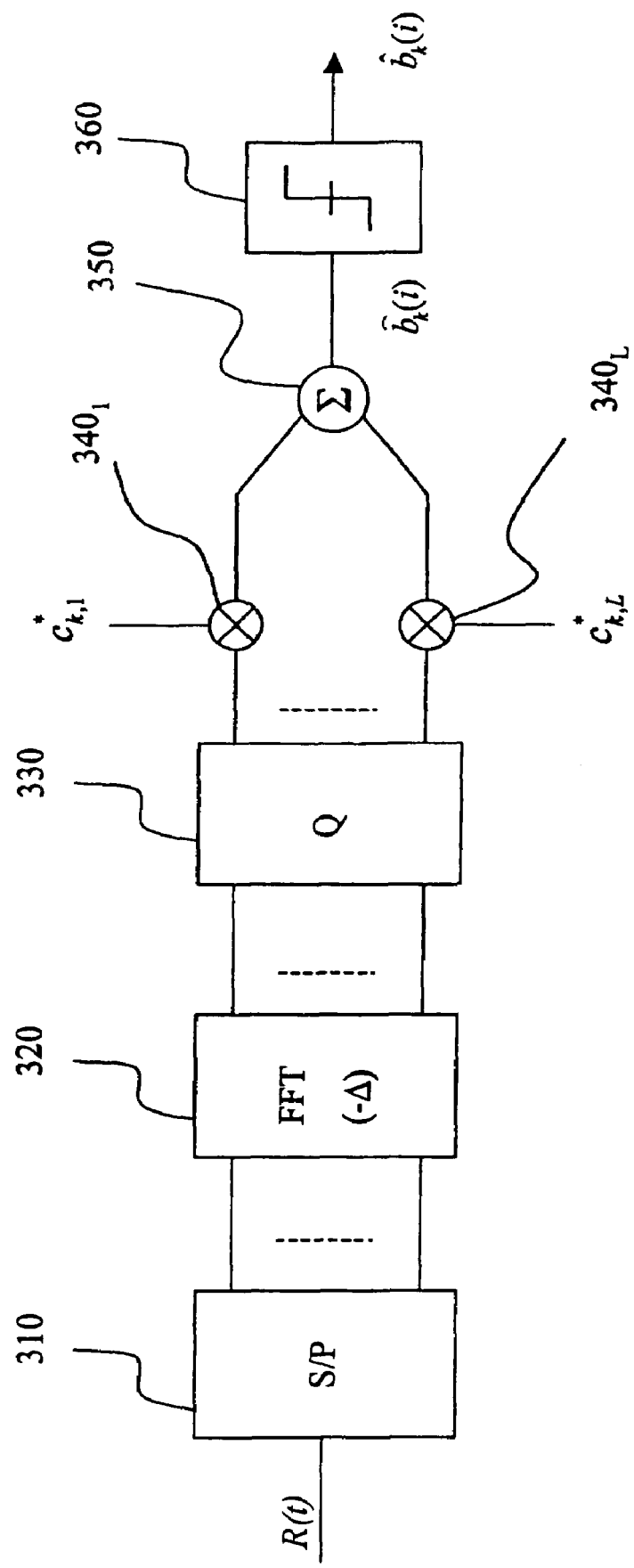
FIG. 3 depicts schematically the structure of a second MC-CDMA receiver known from the state of the art.
Figure 4:
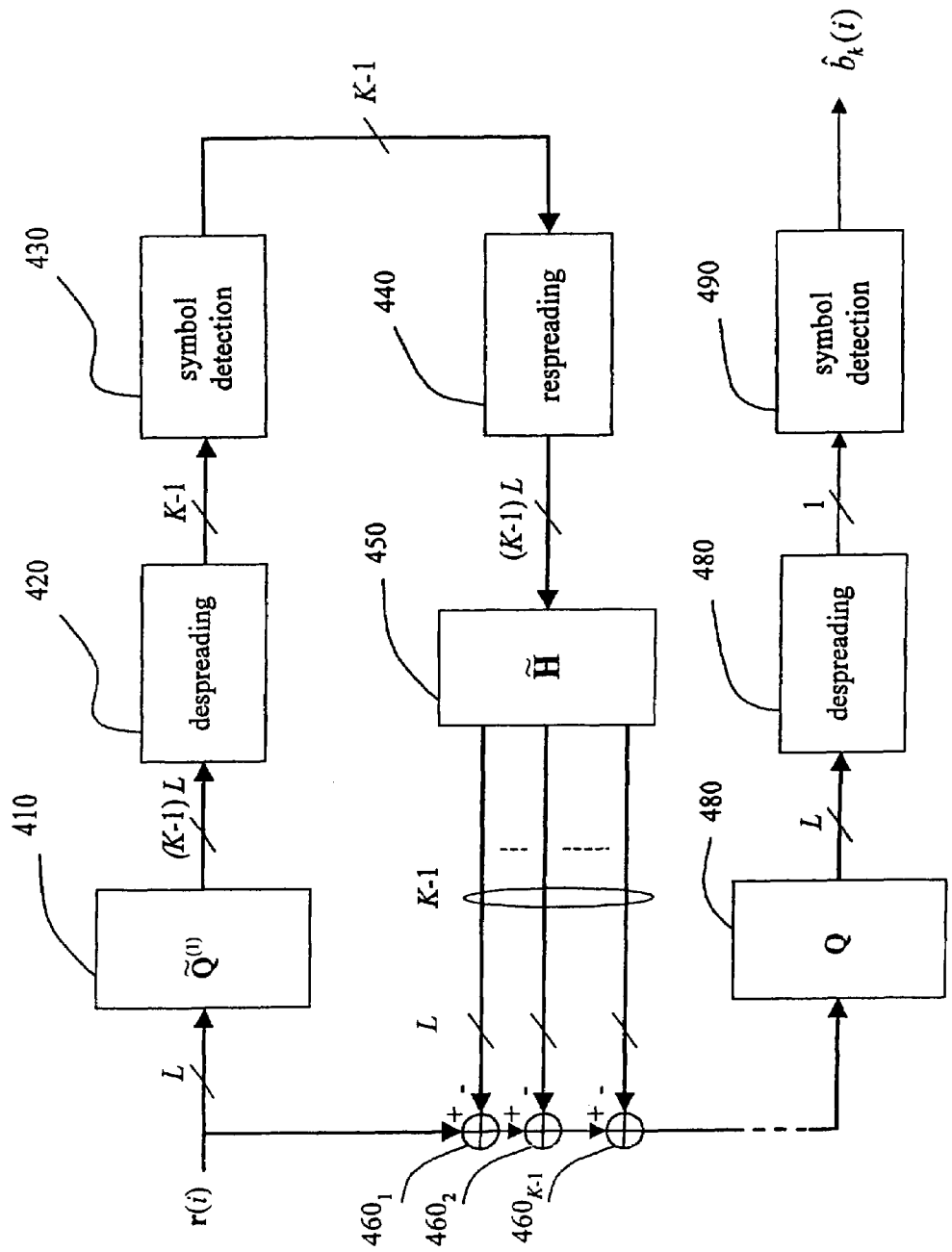
FIG. 4 depicts schematically the structure of an MC-CDMA receiver with parallel interference cancellation as known from the state of the art.

Once again the context of a MC-CDMA receiver with K users will be referred to. The L frequency components output by the FFT at time i can be regarded as a vector $r(i)=(r_1(i), \ldots ,r_L(i))^T$, the expression of which can be derived from equation (2):

$$r(i)=C(i)D_\omega b(i)+\eta(i) \quad (3)$$

where $b(i)=(b_1(i), \ldots ,b_K(i))^T$ is the vector of the K transmitted symbols, $D_\omega=\text{diag}(\omega_1, \ldots ,\omega_K)$ is a diagonal matrix, the elements of which are the amplitudes $\omega_k$ of the symbols transmitted by the users, $\eta(i)=(\eta_1(i), \ldots , \eta_L(i))^T$ is the vector of the noise components on the OFDM multiplex and $$C(i) = \begin{bmatrix} c_{11}h_{11}(i) & \ldots & c_{1K}h_{1K}(i) \\ \vdots & & \vdots \\ c_{L1}h_{L1}(i) & \ldots & c_{LK}h_{LK}(i) \end{bmatrix} \quad (4)$$

is a matrix combining the effect of spreading and of channel propagation.

In the downlink, all the users share the same channel and the matrix C(i) can be expressed by $C(i)=H(i)C_D$ where $H(i)=\text{diag}(h_1(i), \ldots, h_L(i))$ and $C_D$ is the L×K matrix containing the codes of the active users:

$$C_D = (c_1 \ldots c_K) = \begin{bmatrix} c_{11} & \ldots & c_{1K} \\ \vdots & & \vdots \\ c_{L1} & \ldots & c_{LK} \end{bmatrix} \quad (5)$$

If we assume that the components of the noise η(i) are AWGN (Additive White Gaussian Noise) with covariance matrix $E[\eta(i)\eta^H(i)]=N_0 O_L$ where $I_L$ is the L×L identity matrix and $N_0$ the noise variance, the maximum likelihood detection of the transmitted signal consists in finding the symbol b which minimises the quadratic distance $d_{Emin}^2(b)$ between the received signal and the signal expected to be received if b was transmitted. Hence, from equation (3), said symbol b should minimise:

$$d_E^2(b)=\|r(i)-C(i)D_\omega b\|^2 \quad (6)$$

Equivalently, since r(i) is known, said symbol b should minimise the expression:

$$d^2(b)=\|C(i)D_\omega b\|^2-2\text{Re}\langle C(i)D_\omega b;r(i)\rangle \quad (7)$$

where the scalar product $\langle C(i)D_\omega b;r(i)\rangle$ can be expressed:

$$\langle C(i)D_\omega b; r(i)\rangle = \sum_{k=1}^{K} \omega_k b_k^* \sum_{l=1}^{L} c_{lk}^*(i) h_{lk}^*(i) r_l(i) \quad (8)$$

Let us define $$y_k(i) = \omega_k \sum_{l=1}^{L} c_{lk}^*(i) h_{lk}^*(i) r_l(i) \quad (9)$$

the output of a filter matched to the signature of the user k and the propagation channel. $y_k(i)$ may also be viewed as the Maximum Ratio Combining of the components $r_l(i)$ of the received vector r(i), for user k. Equation (8) can be simply reformulated:

$$\langle C(i)D_\omega b; r(i)\rangle = \sum_{k=1}^{K} b_k^* y_k(i) \quad (10)$$

Let us denote $y(i)=(y_1(i), \ldots ,y_K(i))^T$ the observation vector of the outputs $y_k(i)$ for the K users. According to equation (7) and (10), the vector y(i) represents a sufficient statistic for the maximum likelihood detection of the transmitted vector b(i).

It is important to note, that using y(i) instead of r(i) for the multi-user detection advantageously reduces the observation dimension from L to K. The observation vector y(i) may be written in a matrix form from equation (9):

$$y(i)=D_\omega C^H(i) r(i) \quad (11)$$

where $\bullet^H$ denotes the transpose-conjugate. By replacing expression (3) in expression (11), the observation y(i) can be obtained as a function of the transmitted vector b(i):

$$y(i)=D_\omega C^H(i)C(i)D_\omega b(i)+n(i)=R(i)b(i)+n(i) \quad (12)$$

where $R(i)=D_\omega C^H(i)C(i)D_\omega$ and $E[n(i)n^H(i)]=N_0 R(i) \quad (13)$ It has been described in French patent application FR0104050 filed by the Applicant on Mar. 22, 2001 and included herein by reference a multi-user detection method based on Wiener filtering of the observation vector y(i). According to this method, the vector of the estimated symbols $\hat{b}(i)=(\hat{b}_1(i), \ldots ,\hat{b}_K(i))^T$ is obtained from:

$$\hat{b}(i)=Fy(i) \quad (14)$$

where the matrix F is given by the Wiener-Hopf formula:

$$F=R_{by}R_{yy}^{-1} \quad (15)$$

and where $R_{by}$, $R_{yy}$ are the covariance matrix of b and y and the autocovariance of y respectively. The matrix F can thus be expressed as:

$$F=E(b(i)y^H(i))E(y(i)y^H(i)) \quad (16)$$

By replacing equation (12) and (13) into equation (16) and assuming that symbols have a unit energy:

$$F=(R(i)+N_0 I_K)^{-1} \quad (17)$$

where $I_K$ is the K×K identity matrix.

The operation (14) can be regarded as an MMSE (Minimum Mean Square Error) equalisation process using the matrix F.

Now, the basic idea underlying the invention is to propose a multi-user detection method with parallel interference cancellation at the symbol level and not at the carrier level as in the prior art set out in the introductive part.

Figure 5:
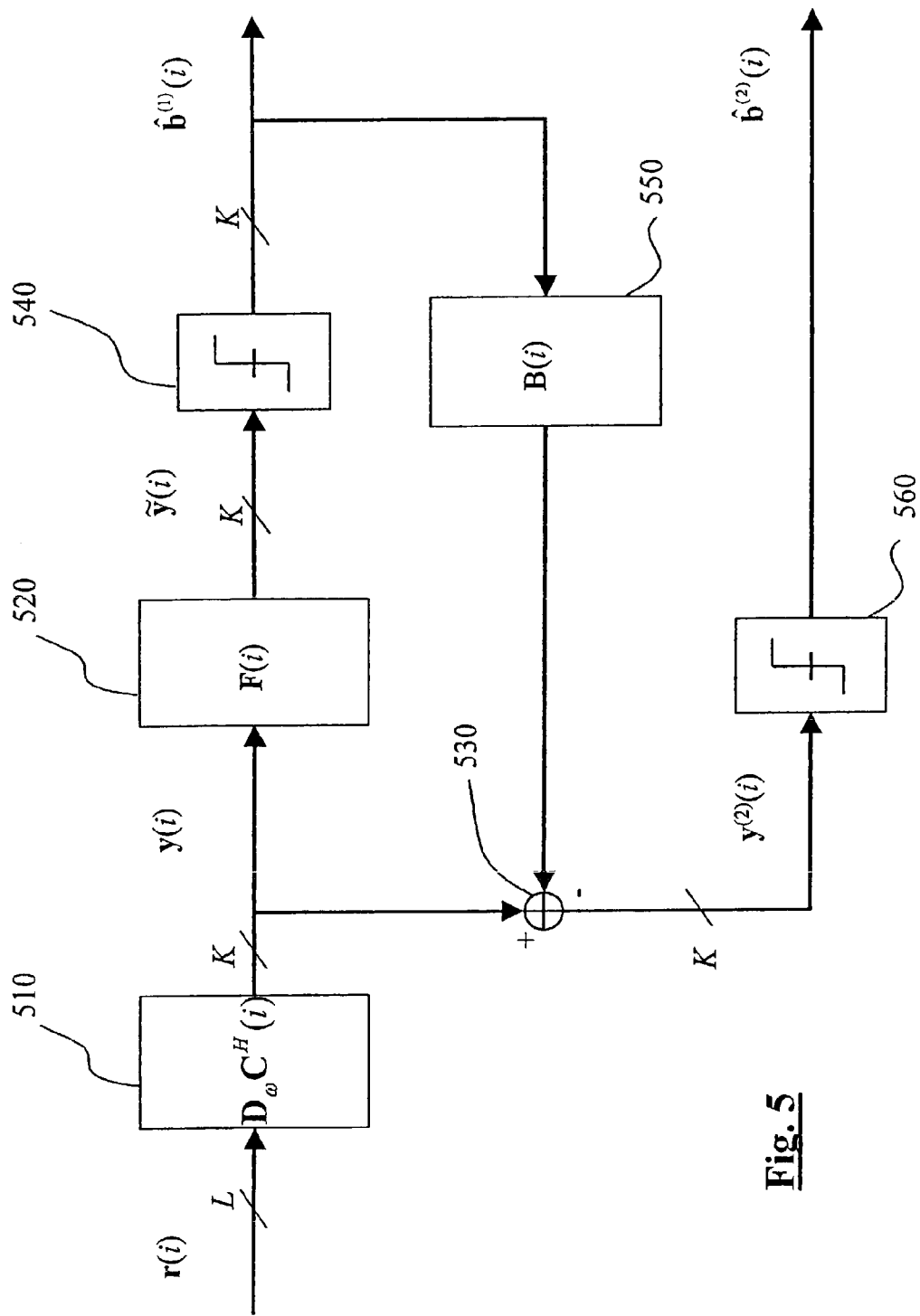
FIG. 5 depicts schematically the structure of a MC-CDMA receiver with parallel interference cancellation according to a first embodiment of the invention.

The structure of a multi-user detector according to a first embodiment of the invention is illustrated in FIG. 5. The multi-user detector comprises a filter 510 matched to the signatures of the users and to the response(s) of the propagation channel(s) (the plural stands for the uplink). The filter 510 multiplies the vector r(i) of the frequency components by the matrix $D_\omega C^H(i)$ in order to output the observation vector y(i) according to equation (11). The detector comprises also an equalisation filter 520 and an interference reconstruction filter 550. The equalisation filter performs a multiplication of the observation vector y(i) by a matrix F(i) and outputs a vector denoted ỹ(i). The components of the vector ỹ(i) are then subjected to hard decision in the detector 540 which outputs a vector $\hat{b}^{(1)}(i)$ of the estimated symbols for the K users (superscript 1 stands for the first stage). The vector of estimated symbols is subjected to a multiplication by a matrix B(i) in the filter 550. The output of the second filter 550 is subtracted in 530 from the output of the matched filter 510 to provide a new observation vector $y^{(2)}(i)$ (where superscript 2 stands for the second detection stage):

$$y^{(2)}(i)=y(i)-B(i)\hat{b}^{(1)}(i) \quad (18)$$

which is substantially freed from MAI. The symbols of or for the different users are then estimated from the new observation vector $y^{(2)}(i)$ in the hard decision detector 560. The vector of the estimates at the second detection stage is denoted $\hat{b}^{(2)}(i)$. The estimated symbols are then demodulated into bits (whereby the symbols −1,1 are respectively transformed into 0,1 if BPSK modulation is used) and the obtained bits are subsequently channel decoded. Alternatively, if BPSK modulation is used, channel decoding may take place prior to demodulation.

The matrix F(i) depends upon the criterion used for the equalisation. For an equalisation of the MMSE type, F(i) is given by equation (17), i.e. $F(i)=(R(i)+N_0I_K)^{-1}$.

Alternatively, for an equalisation based on the Zero Forcing (ZF) criterion, the matrix F(i) is simply given by:

$$F(i)=(R(i))^{-1} \quad (19)$$

It should be noted that, instead of multiplying y(i) by the matrix F(i) for obtaining ỹ(i), in practice, the linear system $(R(i)+N_oI_K)\tilde{y}(i)=y(i)$ or $R(i)\tilde{y}(i)=y(i)$ will be solved.

Recalling that the component of the observation vector for user k is $$y_k(i) = \omega_k \sum_{l=1}^{L} c_{lk}^*(i) h_{lk}^*(i) r_l(i),$$

if we have an estimate $\hat{b}^{(1)}(i)$ of the K transmitted symbols, we can derive a new component which is cleared from MAI:

$$y_k^{(2)}(i) = \omega_k \sum_{l=1}^{L} c_{lk}^*(i) h_{lk}^*(i) \left[ r_l(i) - \sum_{\substack{k'=1\\k'\neq k}}^{K} \omega_{k'} c_{lk'}(i) h_{lk'}(i) \hat{b}_{k'}^{(1)}(i) \right] \quad (20)$$

where the expression between square brackets gives the received signal on subcarrier l cleared from the contribution of the other users k'≠k.

Expression (20) can be reformulated as follows:

$$y_k^{(2)}(i) = y_k(i) - \omega_k \sum_{l=1}^{L} \sum_{k'=1}^{K} \omega_{k'} c_{lk'}(i) h_{lk'}(i) c_{lk}^*(i) h_{lk}^*(i) \hat{b}_{k'}^{(1)}(i) + \omega_k^2 \sum_{l=1}^{L} c_{lk}(i) c_{lk}^*(i) h_{lk}(i) h_{lk}^*(i) \hat{b}_k^{(1)}(i) \quad (21)$$

which can be rewritten in a matrix form:

$$y^{(2)}(i)=y(i)-R(i)\hat{b}_1(i)+\text{diag}(R(i))\hat{b}_1(i)=y(i)-B(i)\hat{b}_1(i) \quad (22)$$

where diag(R(i)) is a matrix having the same diagonal as R(i) and zero off-diagonal elements. The expression of the matrix B(i) for the interference reconstruction filter can therefore read as follows:

$$B(i)=R(i)-\text{diag}(R(i)) \quad (23)$$

The parallel interference cancellation scheme can therefore be performed entirely at the symbol level. This significantly reduces the complexity of implementation, especially when the number of active users K is lower than the number of carriers L in the OFDM multiplex.

Figure 6:
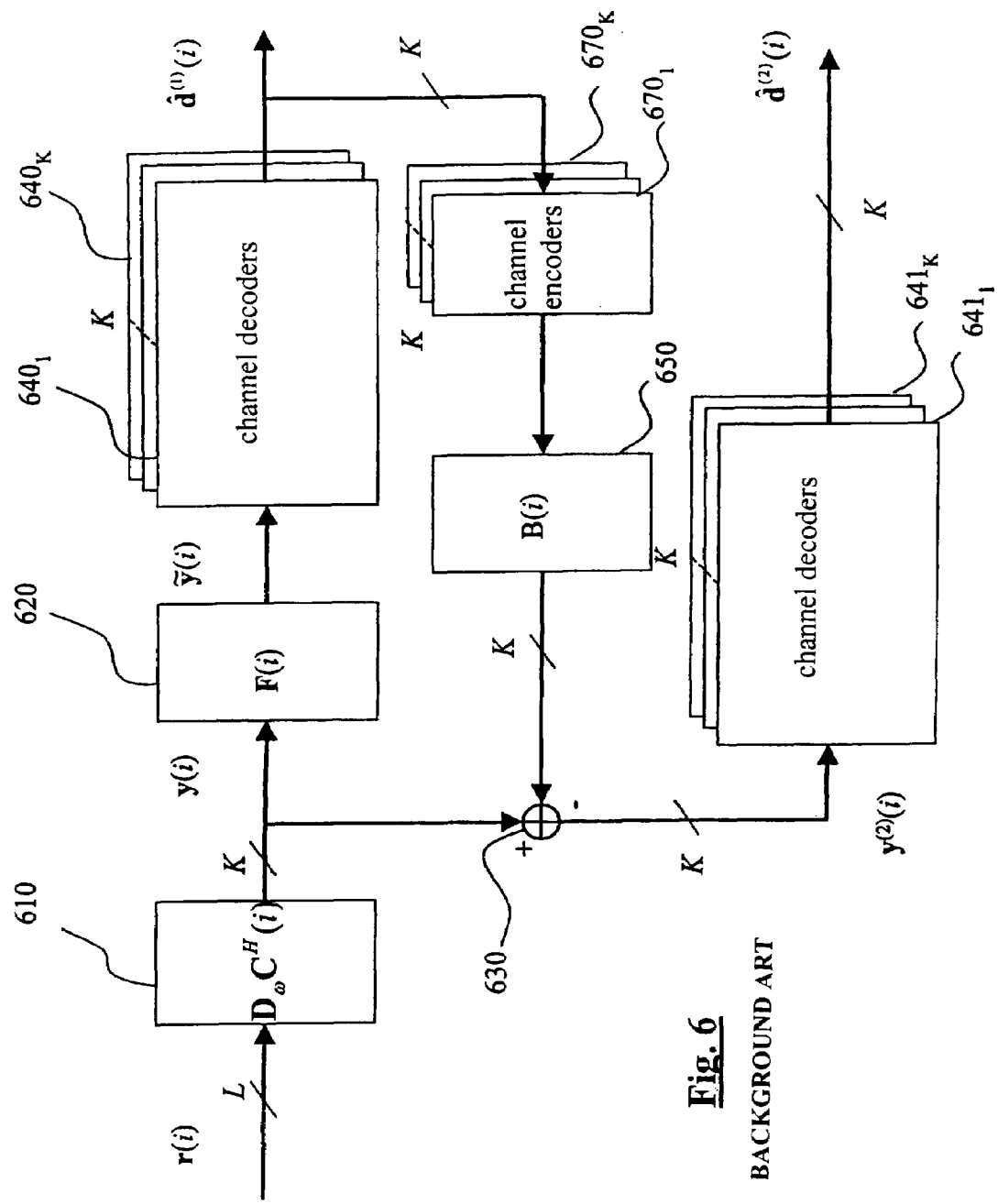
FIG. 6 depicts schematically the structure of a MC-CDMA receiver with parallel interference cancellation according to a second embodiment of the invention.

The structure of a multi-user detector according to a second embodiment of the invention is illustrated in FIG. 6. The blocks 610, 620 and 650 are respectively identical to blocks 510, 520 and 550 of FIG. 5. For the sake of simplicity, the multi-user detector has been illustrated for a BPSK modulation, although other types of modulation may be used.

In this embodiment, the user data is subjected to channel coding prior to spreading in the frequency domain, at the transmitter side. Furthermore, as known to the man skilled in the art, interleaving steps may be inserted prior to or/and after channel coding. The conventional methods of block coding, convolutional coding or turbo-coding can be used for channel coding.

In contrast with the previous embodiment, there are provided K channel decoders $640_1, \ldots, 640_K$ after the equalisation filter 620, for the K active users, respectively. Each of these decoders performs a channel decoding of the data for one of the K active users. More precisely, decoder $640_k$ inputs soft values ỹk(i) and outputs channel decoded data for user k, denoted $\hat{d}_k^{(1)}(i)$. The channel decoded data for the K users are represented by vector $\hat{d}^{(1)}(i)$. The estimated data $\hat{d}_k^{(1)}(i)$, k=1, . . . ,K are then respectively reencoded by the channel encoders $670_k$, k=1, . . . ,K before being filtered by the interference reconstruction filter 650. Alternatively, if the decoders $640_k$, k=1, . . . ,K are able to supply the estimated data in encoded form, the channel encoders $670_k$, k=1, . . . ,K will be omitted and the estimated data in encoded form will be supplied directly to the interference reconstruction filter 650. For example, if the decoder $640_k$, is a Viterbi decoder, the decoder $640_k$ is able to supply the channel decoded data and the data in the channel encoded form along the maximum likelihood path in the code trellis.

After interference cancellation in 630, the new observation vector $y^{(2)}(i)$ cleared form MAI is subjected to channel decoding in the decoders $641_1, \ldots, 641_K$ similar to decoders $640_1, \ldots, 640_K$ to output channel decoded data $\hat{d}^{(2)}(i)$ for the K users. The channel decoded data for the K users at the second stage are represented by vector $\hat{d}^{(2)}(i)$. Of course, if the user data are interleaved at the transmitter side, e.g. after channel coding, deinterleavers and interleavers have to be provided before the channel decoders $640_1, \ldots, 640_K$ and after the channel encoders $670_1, \ldots, 670_K$, respectively.

It should be understood that the data output from the channel encoders $670_k$ k=1, . . . ,K have to be modulated into symbols prior to the filtering by the interference reconstruction filter 650.

In this embodiment, it should also be understood that the decoders $640_1, \ldots, 640_K$ and $641_1, \ldots, 641_K$ can be realised by a SISO (soft-in soft-out) decoder followed by a thresholder.

Figure 7:
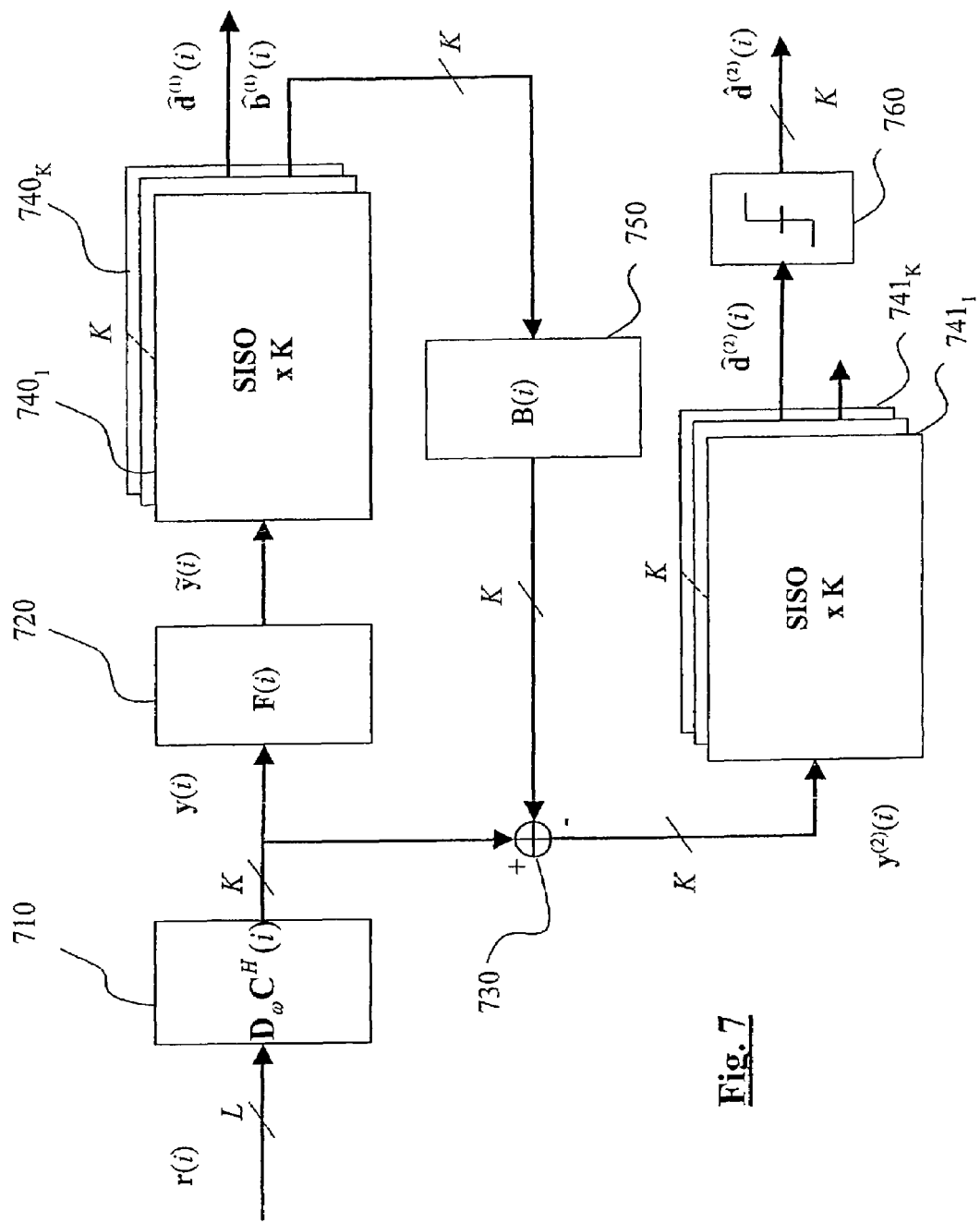
FIG. 7 depicts schematically the structure of a MC-CDMA receiver with parallel interference cancellation according to a third embodiment of the invention.

The structure of a multi-user detector according to a third embodiment of the invention is illustrated in FIG. 7. The blocks 710, 720 and 750 are respectively identical to blocks 510, 520 and 550 of FIG. 5. For the sake of simplicity, the multi-user detector has been illustrated for a BPSK modulation, although other types of modulation may be used.

This embodiment makes use of SISO (soft-in soft-out) decoders $740_1, \ldots, 740_K$ which can be SOVA (Soft-Output Viterbi Algorithm) decoders or belong to the family of the MAP (Maximum A Priori) decoders. In both cases, the decoder $740_k$ is adapted to supply both the channel decoded data $\hat{d}_k^{(1)}(i)$ and the corresponding data in channel encoded form $\hat{b}_k^{(1)}(i)$ for user k. For example, if SOVA decoders are used, the decoder $740_k$ outputs both the channel decoded data and the corresponding data in channel encoded form along the maximum likelihood path in the code trellis. MAP decoders can also output both a posteriori channel decoded data and corresponding data in channel encoded form as described in the article from S. Benedetto et al. entitled Soft-input soft-output modules for the construction and distributed iterative decoding of code networks published in European Transactions on Telecommunications, Vol. 9, No. 2, March–April 1998.

The decoded data for the K users are denoted as a vector $\hat{d}^{(1)}(i)$ while the data in encoded form for the K users are denoted as a vector $\hat{b}^{(1)}(i)$. The data in encoded form is directly filtered by the interference reconstruction filter 750. In contrast with the previous embodiment, channel encoders are no longer needed, thus further reducing the complexity of the receiver. After interference cancellation in 730, the new observation vector $y^{(2)}(i)$, cleared form MAI, is submitted to soft channel decoding in the SISO decoders 741$_1$, ..., 741$_K$. The soft outputs $\hat{d}_k^{(2)}(i)$ represented as vector $\hat{d}^{(2)}(i)$ are t thresholded in hard decision module 760 to give the channel decoded data of the K active users, represented as a vector $\hat{d}^{(2)}(i)$ of components $\hat{d}_k^{(2)}(i)$, where $\hat{d}_k^{(2)}$ channel decoded data for the user k. Here again, if a modulation other than BPSK is used, the data in channel encoded form, output from the channel encoders 740$_k$, k=1, ..., K and represented by vector $\hat{b}^{(1)}(i)$, have to be modulated into symbols prior to the filtering by the interference reconstruction filter 750.

It is important to note that the embodiments of the invention described above apply equally to downlink and uplink MC-CDMA receivers.

Furthermore, although the multi-user detection device for an MC-CDMA receiver according to the invention has been described in terms of functional modules e.g. filters or estimating means, it goes without saying that all or parts of this device can be implemented by means of a single processor either dedicated for fulfilling all the functions depicted or in the form of a plurality of processors either dedicated or programmed for each fulfilling one or some of said functions.

What is claimed is:

1. A multi-user detection method for a receiver in a multi-carrier code division multiple access telecommunication system, each communication to or from a user of the system being coded with a signature, the signal received by said receiver being decomposed into a first plurality (L) of frequency components, said method comprising:

first filtering said frequency components matched to the respective signatures of a second plurality (K) of users and to the common or the respective responses of the transmission channels associated to said communications to or from said users;

first estimating symbols or data transmitted to or by said users from the output of said first filtering;

second filtering to derive multi-user interference from said first estimation subtracting the output of said second filtering from the output of said first filtering to provide a cleared output;

second estimating symbols or data transmitted to or by said users from said cleared output.

2. The multi-user detection method according to claim 1, further comprising equalizing the output of said first filtering step prior to said first estimating step.

3. The multi-user detection method according to claim 2, wherein the equalizing step uses a Minimum Mean Square Error equalisation.

4. The multi-user detection method according to claim 3, wherein said Minimum Mean Square Error equalization comprises a multiplication step by a matrix $F=(R(i)+N_0 I_K)^{-1}$ where $R(i)$ is the auto covariance matrix of the output of said first filtering, $I_K$ is an identity matrix of size K, and $N_0$ is the noise variance.

5. The multi-user detection method according to claim 2, wherein the equalizing step uses a Zero Forcing equalisation.

6. The multi-user detection method according to claim 5, wherein said Zero Forcing equalization comprises a multiplication step by a matrix $F=(R(i))^{-1}$ where $R(i)$ is the auto covariance matrix of the output of said first filtering.

7. The multi-user detection method according to claim 2, wherein said first estimating step applies a first channel decoding step (640$_1$, ..., 640$_K$) to the output of said equalizing step for providing first estimates ($\hat{d}_k^{(1)}(i)$) of data transmitted to or by said users; and said second estimating step applies a second channel decoding step (641$_k$, ..., 64$_K$) to said cleared output for providing second estimates $\hat{d}_k^{(2)}(i)$) of said data.

8. The multi-user detection method according to claim 7, wherein said first estimates are further subjected to a channel coding step prior to said second filtering; and said cleared output is obtained by subtracting the output of said second filtering from the output of said first filtering.

9. The multi-user detection method according to claim 7, wherein said first estimates are supplied in channel encoded form to said second filtering step; and said cleared output is obtained by subtracting the output of said second filtering step from the output of said first filtering step.

10. The multi-user detection method according to claim 2, wherein said first estimation applies a soft-in soft-out channel decoding step to the output of said equalizing step for providing both first estimates $\hat{d}_k^{(1)}(i)$) of data transmitted to or by said users and corresponding data in channel encoded form.

11. The multi-user detection method according to claim 10, wherein said second filtering is applied to said data in channel encoded form; and said cleared output is obtained by subtracting the output of said second filtering step from the output of said first filtering step.

12. The multi-user detection method according to claim 2, wherein said first estimating step provides first estimates ($\hat{b}_k^{(1)}(i)$) of the symbols transmitted to or by said users by applying a hard decision on the output of said equalizing step; and said second estimation provides second estimates ($\hat{b}_k^{(2)}(i)$) of said symbols by applying a hard decision to said cleared output.

13. The multi-user detection method according to claim 12, wherein said second filtering is applied to said first estimates $\hat{b}_k^{(1)}(i)$); and said cleared output is obtained by subtracting the output of said second filtering from the output of said first filtering.

14. A multi-user receiver for a multi-carrier code division multiple access telecommunication system, configured to carry out the multi-user detection method according to any of claims 1 to 11.

15. The multi-user detection method according to claim 1, wherein said first filtering step comprises a multiplication step by a matrix $DTC^H$ where DT is a diagonal matrix containing elements of amplitudes of symbols transmitted by the plurality of users and $C^H$ is the transpose conjugate of a matrix combining the effect of spreading and channel propagation.

16. The multi-user detection method according to one of claims 13, 8, 11, wherein said second filtering step comprises a multiplication step by a matrix $B(i)=R(i)-\text{diag}(R(i))$ where $R(i)$ is the autocovariance matrix of the output of said first filtering and $\text{diag}(R(i))$ is a matrix having the same diagonal elements as $R(i)$ and zero off-diagonal elements.

17. A multi-user receiver for a multi-carrier code division multiple access telecommunication system, configured to carry out the multi-user detection method according to claim 16.

* * * * *